3,396,082
GLUCAN PRODUCTION BY FERMENTATION
OF FLESHY FUNGI
Edwin N. Davis, Robert A. Rhodes, and Lowell L. Wallen, Peoria, Ill., assignors to the United States of America as represented by the Secretary of Agriculture
No Drawing. Filed June 9, 1965, Ser. No. 462,760
1 Claim. (Cl. 195—31)

ABSTRACT OF THE DISCLOSURE

Excellent yield of $\beta$-1,3-glucan polysaccharides are obtained by fermenting mycelium of certain fungi classified as species of Helotium and Plectania under aerobic conditions in a tap water medium initially containing about 4 percent by weight of an assimilable mono- or disaccharide and 0.5 percent by weight of defatted soy flakes, and harvesting the so produced destructable glucan very soon after the disappearance of the nutrient sugar.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to a microbiological process for producing glucan-type polysaccharides in commercially attractive yields.

More particularly, this invention pertains to a process that provides unexpectedly extensive exocellular productions of beta-1,3-gluman-type polymers by specific higher fungi, namely by *Plectania occidentalis* NRRL 3137 and preferably by Helotium sp. NRRL 3129 when their mycelia are cultivated under submerged aerobic conditions. Our process also reflects the discovery that the effective recovery of substantially all of the thereby produced polysaccharide, including that formed terminally from the organism's reserves, is critically contingent on the unobvious necessity that the fermentation be terminated and the glucan be harvested within from 2 hours to not more than 4 hours after the total disappearance of the simple sugar from the medium, such termination and recovery being critical to the avoidance of depolymerization and loss of the unremoved glucan polymers.

The beta-linked glucans comprise a well-known group of glucopyranose polymers, the only commercial source of which has been by extraction of the tissue of certain species of marine algae or seaweeds such as those of the family Laminariaceae.

While investigating the mechanism of ergot formation by certain strains of *Claviceps purpurea* Perlin et al., Can. J. Chem. 41: 2278 (1963), precipitated about 1 g. of a fibrous polysaccharide from each liter of filtrate of the viscous fermentation medium and identified the obtained water-insoluble polysaccharide as a glucan consisting of $\beta$-1,3-linked glucopyranosyl units so arranged as to constitute glucose and gentiobiose components. Because of the low yield of glucan and the possibility that the glucan may contain a trace of ergot alkaloid, it is extremely unlikely that the Claviceps fungi will be cultured as an industrial source of a nontoxic mucilagenous glucan useful for thickening foods and for stabilizing suspensions of finely divided particulate matter in other materials. While it is not presently clear just how our glucans differ from that reported by Johnson et al., Chem. Ind. (London) 820–922 (1963), such information may be inherent in publications of which we are not now aware.

One object of our invention is a microbiological process for producing $\beta$-1,3-linked glucans at high conversion efficiencies and in commercially attractive yields. Another object is a microbiological process for the production of glucans without the possibilities of contamination with an extremely potent alkaloid or, even worse, of unintentionally introducing a fungus that may under favorable circumstances form much more than a trace of such alkaloid. The above and other objects will be more fully appreciated by reference to the following disclosure and examples.

Through systematic investigations of nearly 500 specimens of fleshy fungi we have now discovered that submerged aerobic fermentations of either of two distinct species of fleshy fungi of the order Pezizales efficiently convert certain inexpensive carbon sources of $\beta$-1,3-glucans, the solutions of which even at very low concentrations exhibit markedly elevated the pH-stable viscosities that are not appreciably influenced by autoclaving or by the presence of inorganic salts with the exception of borates. The fungi whose glucan-forming abilities comprise the basis of our invention are identified as Helotium sp. NRRL 3129 and *Plectania occidentalis* NRRL 3137, the former organism being of greater interest since it converts the carbohydrate much more quickly and more efficiently and is less fastidious as to the substrate carbohydrate.

In general terms, aerobic fermentations of Helotium mycelia for about 60–72 hours in a tap water medium containing up to 4 percent of a carbon source selected from glucose, fructose, mannose, or sucrose and 0.5 percent of commercially available defatted soy flakes, and 240-hour fermentations of Plectania in a similar medium in which the efficiently converted carbon sources are limited to the monosaccharides glucose and xylose and in which hydrolyzed soy proteins serve as nitrogen sources, provide distinctly viscous fermentation broths from which the glucan polymers can be precipitated with about one-half volume of ethanol for the polymer produced by the Helotium and 2 volumes for the polymer produced by the Plectania fungus.

EXAMPLE 1

10-ml. portions of Helotium sp. NRRL 3129 mycelial culture were introduced into 2,800 ml. Fernbach flasks each containing 500 ml. of sterilized fermentation medium having the following composition in parts by weight per 100 ml.

| | G. |
|---|---|
| Glucose | 4.17 |
| Commercial defatted soy flakes | 0.5 |
| $KH_2PO_4$ | 0.2 |
| Tap water | 95.3 |

The flasks were placed on a rotary shaker having an eccentricity of 2 inches and a speed of 200 r.p.m. The temperature was maintained at 25° C. In previous experiments marked reductions in polymer yield, coincident with failure to harvest the polymer within a few hours after the final disappearance of the glucose from the fermentation medium, led to the finding that although additional glucan polymer is formed during a brief period immediately following the complete disappearance of glucose nutrient, presumably by conversion of the organism's intracellular reserve carbohydrate, the fungus apparently then very shortly responds to the absence of simple carbohydrate in the fermentation medium by releasing an enzyme that degrades the polymer. Therefore, we periodically tested the level of remaining glucose, and harvested the polymer at 60 hours (i.e., 4 hours after the glucose level of the medium had fallen to zero) by diluting the fermentation with an equal volume of distilled water, partially disrupting the mycelia with a blendor to release intimately adherent polymer, centrifuging for 15 minutes at 18,000×G to remove mycelia and debris, adding ½ volume of ethanol to the supernatant, and promoting the separation with ordinary centrifugation. After drying, the polymer weighed 10.75 g. representing a 51.6 percent yield based on the glucose used. For purification and analysis the glucan was resuspended in distilled water, dialyzed for 72 hours, and lyophilized.

The relationship of viscosity to polymer concentration for this glucan and that produced by *Plectania occidentalis* NRRL 3137 is shown in Table I. Highly viscous preparations having the appearance of soft gels are obtained at polymer concentrations of 1 percent and above.

The polymers withstand extended autoclaving in neutral solution; for example, the viscosity of a 0.3 percent solution of the Helotium polymer changed only from 207 cps. to 262 cps. after 60 minutes at 121° C.

TABLE 1.—VISCOSITY OF AQUEOUS SOLUTIONS OF GLUCAN POLYMERS

| Percent (w./v.), Concentration of Polymers | Viscosity (in centipoises) | |
|---|---|---|
| | Helotium sp. 3129 Polymer | *Plectania occidentalis* 3137 Polymer |
| 0.2 | 125 | 150 |
| 0.3 | 210 | 225 |
| 0.4 | 320 | 350 |
| 0.5 | 450 | 495 |
| 0.6 | 590 | 665 |
| 0.7 | 770 | 855 |
| 0.8 | 960 | 1,050 |
| 0.9 | 1,160 | 1,250 |
| 1.0 | 1,355 | 1,450 |
| 1.2 | 1,750 | 1,850 |

Paper chromatography of acid hydrolyzates indicates that glucose is the only component excepting for an extremely small amount of fucose and probably a uronic acid in the polymer produced by the Helotium fungus. Oxidation required an excess of periodate over that used for formic acid production. The molar ratio of total periodate per mole of anhydroglucose units being less than unity, the polysaccharide must contain unreactive glucose residues. The differences in glucose values obtained by glucose oxidase and Shaffer-Somogyi assays of exo-$\beta$-D-1,3-glucanase hydrolyzates show that 64 percent of the reducing sugar liberated from the Helotium glucan by the enzymes is in the form of a disaccharide rather than as glucose. Using the Abdel-Akher et al., procedure, JACS 74: 4970 (1952), on polymer 3137 involving periodate oxidation, reduction, mild acid hydrolysis and neutralization, the absence of further sensitivity to periodate indicated the remaining glucosidic bonds to be exclusively 1,3- or a combination of both 1,3- and branched glucose units containing no free adjacent hydroxyl groups.

Specific rotation values of +20°, −2° and +45° at 25° C. for 0.2 percent solutions of the Helotium glucan in a 50:50 mixture of dimethylformamide and water, in 0.5 N NaOH, and in cuprammonium solvent, Reeves, J. Biol. Chem. 154: 49 (1944), respectively, confirm the beta-configuration, the pyranose ring structure, and the presence of 1,3-glucosidic linkages. However, with polymer 3129 evidence of distinctly lowered molecular weights following the Abdel-Akher et al., procedure taken in conjunction with periodate uptake and formic acid production indicates that 25 percent of the molecule contains 1,6-bonds or a combination of such and terminal hexopyranose units, that 30 percent of the bonds are 1,2- and/or 1,4-, and that 45 percent are 1,3-bonds.

We claim:
1. A microbiological process for obtaining about 50 percent yields of a beta-1,3-glucan comprising:
    (a) inoculating a phosphate buffered tap water medium containing about 4-percent glucose and 0.5-percent defatted soy flakes with mycelium of the fungus Helotium sp. NRRL 3129;
    (b) fermenting the inoculated medium at 25° C. and under aerobic conditions for about 60 hours, coinciding with the disappearance of glucose from the medium;
    (c) and harvesting the glucan within about 3 hours to not over about 5 hours to avoid appreciable loss of glucan through enzymatic degradation action of freshly liberated fungal enzyme.

References Cited

Johnson et al.: Chemistry and Industry (London), pages 820–822, May 1963.

ALVIN E. TANENHOLTZ, *Primary Examiner.*